United States Patent

[11] 3,547,017

[72] Inventor Donald M. Harvey
 Rochester, N.Y.
[21] Appl. No. 718,033
[22] Filed April 2, 1968
[45] Patented Dec. 15, 1970
[73] Assignee Eastman Kodak Company
 Rochester, N.Y.
 a corporation of New Jersey

[54] AUTOMATIC EXPOSURE CONTROL SYSTEM
 10 Claims, 6 Drawing Figs.
[52] U.S. Cl. ................................................. 95/10,
 95/11.5, 95/64
[51] Int. Cl. ..................................................... G03b 7/16,
 G03b 7/08
[50] Field of Search........................................... 95/10C,
 11.5, 53, 64D

[56] References Cited
UNITED STATES PATENTS
3,173,347 3/1965 Stimson et al. ............... 95/11.5X
3,465,656 9/1969 Wick et al. .................... 95/11.5X

*Primary Examiner*—John M. Horan
*Assistant Examiner*—Joseph F. Peters, Jr.
*Attorneys*—Robert W. Hampton and Ronald S. Kareken

ABSTRACT: An automatic exposure control system particularly for photographic flash exposures wherein before exposure a low intensity preflash is used to actuate an electric circuit for setting calibrated exposure control means. Also disclosed are means for automatically focusing a camera lens in coordination with the setting of the exposure control means.

INVENTOR
DONALD M. HARVEY

INVENTOR
DONALD M. HARVEY 3,547,017

AUTOMATIC EXPOSURE CONTROL SYSTEM

BACKGROUND OF THE INVENTION

1. Field of the Invention

This invention relates to automatic flash exposure control systems in photographic cameras.

2. Description of the Prior Art

It is well known in photography to utilize automatic exposure control systems when exposure is to be made with existing light. Such automatic exposure control systems normally operate by determining the intensity of the existing illumination with a light responsive element such as a photocell, and adjusting the exposure regulating devices such as the diaphragm according to the light level indicated. One system comprises adjustment by the deflection of a galvanometer resulting from the change in the electric current of the photocell circuit. However, these systems are inadequate for flash exposure, since they do not compensate for the intensity of illumination which will be available from the exposure flash. One system for indicating proper exposure for flash is described in Stimson, U.S. Pat. No. 3,173,347 which uses an infrared preflash to indicate the combined ambient flash light level resulting from the flash exposure.

SUMMARY OF THE INVENTION

The present invention comprises an automatic flash exposure control system wherein a preexposure flash is provided by a low intensity light or electronic flash to initially illuminate the scene to provide information to permit the automatic setting of the exposure controls. A photocell detects the illumination intensity during the preexposure flash, the resulting weak signal is amplified, and a filter circuit determines that portion of the total illumination due solely to the flash. A galvanometer, which measures this signal, in turn adjusts the exposure control device in proportion to the intensity of the signal received by the galvanometer. Since the preexposure flash is a known fraction of a higher intensity exposure flash, the resulting exposure control mechanism of the camera is adjusted as a function of the circuit to permit the correct amount of light to expose the film when the actual exposure is made with the exposure flash. Furthermore, means may be provided to make any further adjustment necessary to compensate for high level ambient light, and means are provided for overriding the automatic flash exposure control means if the ambient light is of sufficient intensity to make flash exposure unnecessary. A further aspect of the invention comprises means for coupling the focus of the camera lens with the flash exposure control system, whereby focusing is accomplished in conjunction with the setting of the exposure control means by the preexposure flash.

BRIEF DESCRIPTION OF THE DRAWING

Other important aspects and advantages of the invention will be apparent to those skilled in the art by the following description, accompanying the drawing forming a part thereof and wherein.

DESCRIPTION OF THE PREFERRED EMBODIMENTS

Figure 1:
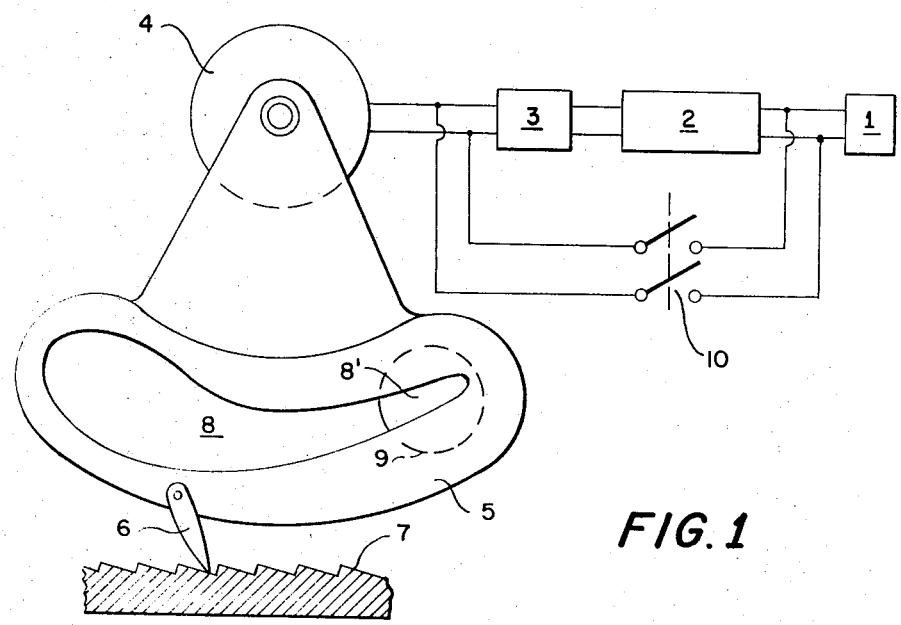
FIG. 1 is a schematic illustration of the basic features of the invention.

Referring to FIG. 1, which schematically shows the invention, an exposure control system according to the invention comprises a light measuring circuit including a photocell or other light responsive element 1, a signal amplifier 2, an electronic signal filter 3, and a switch 10; and the balance of the exposure control system comprises a galvanometer 4, a single vane diaphragm member 5 forming the movable member of the galvanometer and having a tapered aperture 8, a portion 8' of which is shown in alignment with a camera objective 9, and means for locating the diaphragm member 5 relative to the objective 9 comprising a pawl 6 on the member 5 and a fixed ratchet 7. Light, having been reflected from the scene illuminated by a low intensity preexposure flash (not shown) in FIG. 1 is detected by photocell 1. The electrical signal thereby generated is amplified by amplifier 2. Filter 3 segregates the AC portion of the amplified signal, which is that portion of the total electrical signal due solely to the scene illumination caused by the preexposure flash, i.e., the ambient illumination is filtered out. Diaphragm member 5 of galvanometer 4 is deflected by an amount proportional to the signal it receives, the signal corresponding to that which would have received had the flash been the full intensity exposure flash. This deflection results in motion of diaphragm member 5 to the left as shown, whereby aperture 8 is positioned such that a portion 8' of the aperture is located in line with camera lens 9 to permit the proper amount of light to pass through objective 9 to expose properly the film when the camera shutter (not shown) is actuated to make the flash exposure.

The adjustment of the diaphragm as shown is for only one shutter speed, but means may be provided to automatically calibrate the diaphragm setting for other shutter speeds by any of the known means. Pawl 6 and ratchet 7 are provided for holding the diaphragm 5 in the set position. Further means (not shown) are provided for releasing the pawl 6 and diaphragm member 5 after the exposure is made, or when the setting is no longer desired. As shown the setting is accomplished by a movement of the diaphragm member 5 from right to left, with member 5 being reset by movement of member 5 to the right until the maximum portion of aperture 6 is aligned with objective 9. Furthermore, means may be provided for automatically overriding the aforementioned flash exposure setting to take into account the intensity of high levels of ambient light. For instance, this may be accomplished by closing switch 10 first before or after the preexposure flash setting is made to permit an adjustment of the diaphragm member 5 according to the level of ambient light. In either case the pawl and ratchet connection provides that the member 5 is set at the smaller aperture determined by the higher level of light. Normally, however, the ambient light intensity is insignificant when flash exposures are required.

When automatic exposure control is desired for daylight use without flash, switch 10 is maintained in the closed position. Thus, the amplifier 2 and filter 3 are short circuited, and the settings are made as described previously according to the electrical signal resulting from the detection of the ambient light. Likewise, means may be provided for selectively converting the exposure control device to a manual daylight exposure control system comprising the usual manual override arrangement known in the art.

Figure 2:
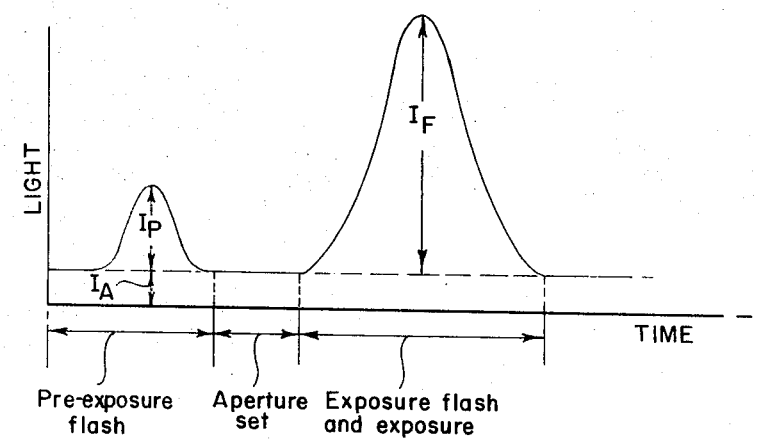
FIG. 2 is a graphical illustration of the relationship between the intensities of the preexposure flash and the exposure flash, and the sequence of operating steps according to the invention.

In FIG. 2, a graph is shown qualitatively comparing the various illumination intensities and sequence of operations associated with the invention. The ambient light level is shown as $I_A$. Initially, the preexposure flash is actuated, giving rise to a peak intensity $I_P$ over the ambient level $I_A$. The automatic flash exposure control system then functions, and the aperture is set as shown. Thereafter, exposure is commenced, and the flash illumination attains a peak intensity $I_F$ above the ambient level $I_A$. The graph shows that the preexposure flash intensity $I_P$ is weak in comparison to the exposure intensity $I_F$. After the exposure process is complete, the pawl 6 is disengaged from the ratchet 7 by known means and the system is reset.

FIG. 2 shows the case when the flash exposure is made immediately following the automatic flash exposure control setting. Normally, it is desirable to make the flash exposure in this manner, especially when the light level or scene are likely to change. Thus, means may be provided for having the exposure process automatically follow the setting of the exposure control means. However, the camera mechanism may also be such that the exposure can be made at the photographer's discretion following the setting of the automatic exposure control system, or it may be such that the photographer can selectively switch the mechanism to provide for either exposure method.

Figure 3:
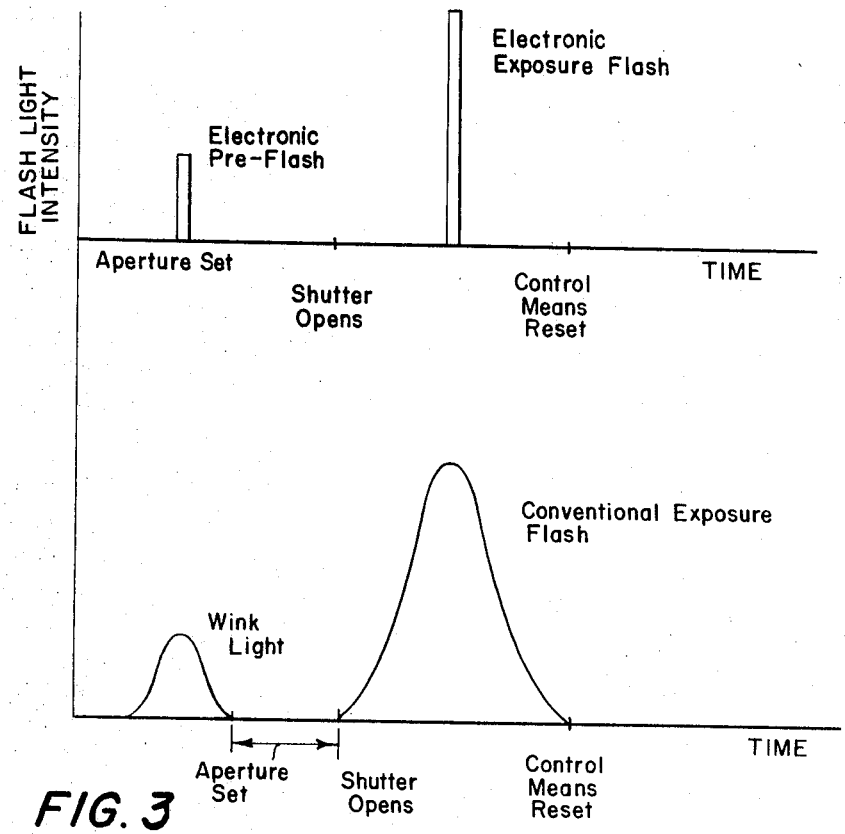
FIG. 3 is a graphical illustration of electronic flash and conventional flash embodiments of the invention.

FIG. 3 shows a graphical comparison of a short duration light preexposure flash accompanied by a conventional exposure flash, and a low intensity electronic preexposure flash accompanied by an electronic exposure flash when these systems are incorporated in the invention. The usual advantages and shortcomings of each type apply here. The electronic preexposure flash means are practical when a power supply can be provided. The electronic preflash is not as bright as the exposure flash since, as mentioned before, a weak signal is sufficient. As shown in FIG. 3, the electronic flash is of much shorter duration than the conventional flash, and reaches its peak intensity almost immediately.

Figure 4:
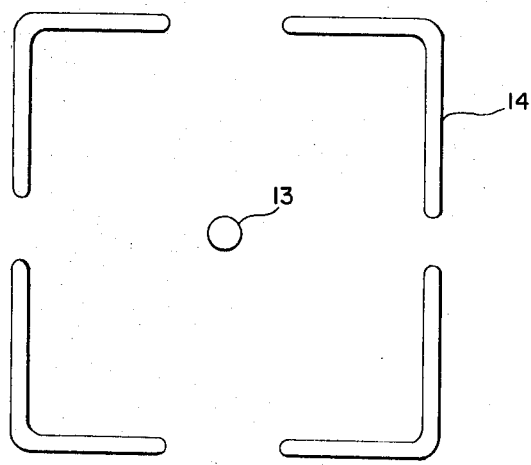
FIG. 4 shows a viewfinder reticle used in conjunction with an embodiment of the invention.

With a short duration light, the preexposure beam can be concentrated both to increase the electrical signal strength generated in the system, and to reduce the effect of background or uninteresting foreground during the setting before exposure. When a beamed spot preflash is employed, a spot 13 in viewfinder reticle 14, as shown in FIG. 4, is superimposed over the desired portion of the viewed subject. The camera operating button (not shown) is then depressed to actuate camera operation with the actuation of the preexposure flash occuring during part of the pretravel of the shutter release. In this instance, switch 10 may be initially closed and then opened when the preexposure flash is actuated. In either case, the exposure flash and film exposure can be programmed to follow closely the preexposure flash. If the preexposure flash is not beamed, i.e. in the electronic preflash and flash embodiment, the entire scene is monitored, and it is therefore unnecessary to compose the scene in the viewfinder following the preexposure flash.

Figure 5:
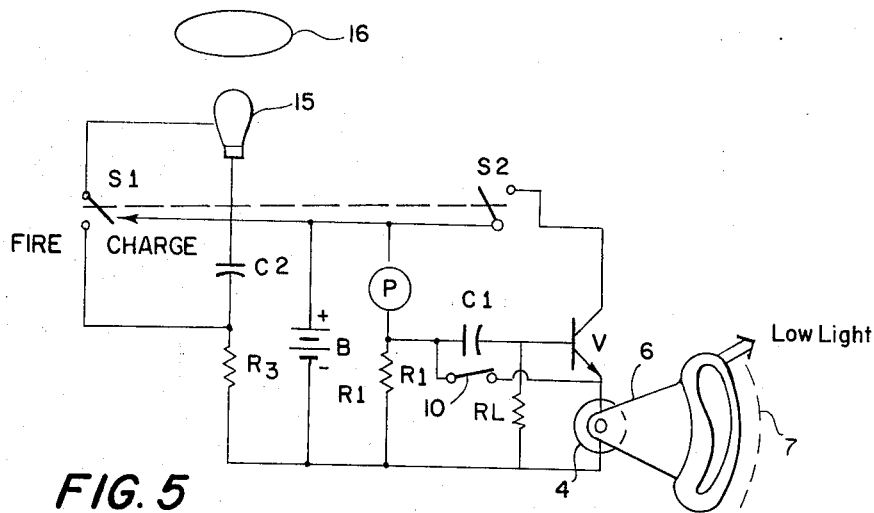
FIG. 5 shows the circuitry and details of the preferred embodiment of the invention.

The details of the preferred embodiment of the invention are shown in FIG. 5. This embodiment uses an incandescent short duration light 15 which is beamed by lens 16, as indicated in the preceding section. The galvanometer 4, diaphragm 5, pawl 6, ratchet 7, aperture 8 and lens 9 are shown and described with reference to FIG. 1. Lamp 15 is flashed by power from capacitor C2 which is charged by battery B through resistor R3. Light reflected from the scene is detected by cadmium sulfide cell P which is restricted in view to detect only the beam emitted by lamp 15 to increase the signal to noise ratio. Cell P corresponds to photocell 1 in FIG. 1 and comprises a photoresistive element. The resistance change in the cell P is reflected in a rapid change in voltage at the junction of cell P and resistor $R_1$, which then passes through capacitor C1, which functions as the filter, to the base of transistor V which operates as the amplifier. This controls the power from battery B through galvanometer 4. Switches S1 and S2 are coupled, as indicated by the dotted line connecting them, to close so that SW2 closes before SW1 moves from the "CHARGE" position to the "FIRE" position. Switch 10, which bypasses the above circuitry is normally closed to indicate the level of ambient light. Thus, the requirement for flash exposure is indicated initially in a conventional manner by galvanometer needle 17 which may be viewed in the viewfinder. If such a low level is indicated, the camera is set for the preflash-flash exposure condition by opening switch 10 and closing the S1 and S2 switches.

Figure 6:
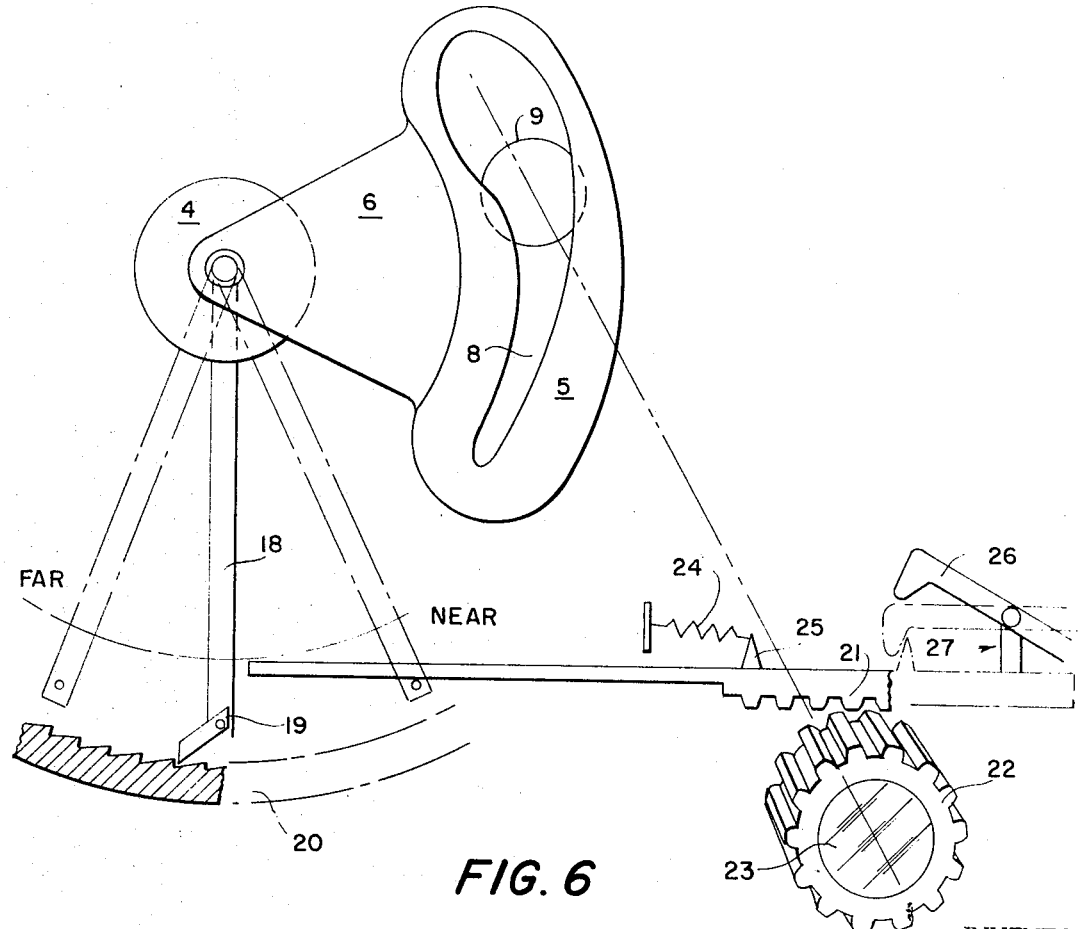
FIG. 6 illustrates a further embodiment wherein means are provided for coupling the camera focus mechanism with the preflash exposure control system.

A further aspect of this invention is shown in FIG. 6 in which the coupling of focusing means with the camera objective 9 to allow the lens to move into the focus position corresponding to the range of the subject. Since in most instances all photographic subjects exhibit substantially the same reflectance under flash illumination and since the intensity varies with distance, the intensity of the flash illumination which is detected by the photocell circuit is a fairly accurate indication of the range of the subject. Thus, it is possible to use the electrical signal resulting from the preexposure flash to focus the camera lens for the subject's range as well as to set the diaphragm. Hence, in FIG. 6 the diaphragm 5 and galvanometer 4 function as previously described to effect the correct exposure aperture. In the present embodiment, there is provided an arm 18 that moves with diaphragm member 5. Arm 18 is held in position by pawl 19 and ratchet 20, which operate in the manner as described with reference to FIG. 1. Initially, arm 18 is positioned at the left end of ratchet 20 which comprises the maximum exposure aperture, so that movement of arm 18 toward the other end of ratchet 20 is not prevented. When the electrical signal received by the galvanometer 4 indicates high intensity reflection from the subject, diaphragm 5 moves in a counterclockwise direction, thereby stopping down the lens aperture. Thus, arm 18 moves to the right as shown by the dotted lines towards the "NEAR" position, because high intensity reflection to the photocell indicates a close subject range. If the electrical signal indicates low intensity reflection, diaphragm 5 moves counterclockwise a lesser amount toward arm 18 and is located at the "FAR" position in proportion to the intensity of the electrical signal. Arm 18 acts to position a focusing gear rack 21 as will now be shown.

Gear rack 21 engages gear 22 which is a screw mount for the focusing lens 23 of the camera. The rack 21 is biased to the left, i.e. towards the farthermost position of arm 18, by spring 24 which is attached to lug 25 on rack 21. In the operation of this arrangement, rack 21 is initially held to the extreme right by arm 26, which engages lug 25 as shown by the dotted lines. After the exposure setting of diaphragm member 5 has been made, and arm 18 is positioned according to the range of the subject by the engagement of pawl 19 with ratchet 20, arm 26, which pivots about pivot 27, disengages from lug 25 as shown, and rack 21 is urged towards arm 18 by spring 24. Movement of rack 21 terminates when the rack end contacts arm 18, and is retained in that position by arm 18 and by the force of spring 24. Thus, arm 18 is now locked by pawl 19 and rack 21. As the rack 21 makes this movement, it turns the geared lens screw mount 22, which causes the forward or backward movement of focusing the lens 23. The lens movement is calibrated to maintain its focal point on the film plane in accordance with the range of the subject. After the lens 23 has been located in the correct focus position, the exposure is made. The operation of arm 26 is preferably accomplished automatically in conjunction with the rest of the system, but means may also be provided to operate it manually. Following the exposure, pawl 19 is disengaged from ratchet 20, rack 21 is retracted, and the entire system is reset for the next exposure.

The invention has been described in detail with particular reference to preferred embodiments thereof, but it will be understood that variations and modifications can be effected within the spirit and scope of the invention as described hereinabove and as defined in the appended claims.

I claim:

1. For use in a camera, an exposure control apparatus for adjusting an exposure varying member in response to preexposure flash illumination, said apparatus comprising:

means for providing preexposure flash illumination of a photographic subject that is also partially illuminatable by ambient light;

circuit means having an element illuminatable by flash and ambient light reflected from said subject for generating an intermediate signal as a function of the total illumination of said element;

filtering circuit means for receiving said intermediate signal and for generating an output signal as a function of the proportion of the total illumination of said element contributed by preexposure flash illumination reflected from the subject; and means responsive to said output signal for adjusting the exposure varying member.

2. An exposure control apparatus according to claim 1 wherein said preexposure flash is of lower intensity than a subsequent exposure flash, and further comprising amplifier means to amplify the output signal.

3. An exposure control apparatus according to claim 1 wherein said adjustable exposure means comprises an adjustable diaphragm, and further comprising releasable locking means to set the diaphragm at the regulated position.

4. An exposure control apparatus according to claim 1 wherein said preexposure flash is an electronic flash.

5. An exposure control apparatus according to claim 1 and further comprising means to beam illumination of said preexposure flash.

6. An exposure control apparatus according to claim 1 further comprising focusing means for adjusting the position of the camera objective, the focusing means being responsive to said exposure regulating means.

7. In a camera, an automatic exposure control apparatus comprising:
   means for providing a low intensity preexposure flash, said preexposure flash having an intensity proportional to the intensity of a subsequent exposure flash;
   circuit means for detecting the reflection of light from the subject resulting from the preexposure flash, said circuit means comprising: an amplifier, a filter, and a light-responsive cell, said cell acting in conjunction with the amplifier and filter for generating an electrical signal proportional to the intensity of the reflection resulting from the preexposure flash;
   an electromechanical transducer having a mechanical output member adapted to be deflected an amount proportional to the intensity of the electrical signal;
   an adjustable exposure varying member connected to said mechanical output member for varying exposure according to said deflection to provide for proper exposure when the exposure flash is actuated; and
   means for locking said exposure varying member in said adjusted position.

8. An exposure control apparatus according to claim 7 further comprising means for focusing the lens of said camera according to the subject's range.

9. An exposure control apparatus according to claim 8 wherein said focusing means comprises movable arm positioned by said mechanical means and moved an amount proportional to the deflection of said mechanical means, means for locking the arm in said position a gear rack, means for urging said gear rack towards said arm such that said rack travels in a restricted path until contacting said arm to position said rack a rotatable mount for the objective of the camera engaged by said rack, said mount being turned by said rack when the rack is urged towards said arm to focus the objective in accordance with the position of said arm.

10. For use in a camera an adjustable exposure control apparatus for adjusting an exposure varying member, said apparatus comprising:
   means for generating a preexposure flash to illuminate a subject scene that is also partially illuminatable by ambient light;
   photoresponsive circuit means for detecting light from the scene and for generating an intermediate signal as a function of the total illumination of the scene;
   filtering means for receiving said intermediate signal and for generating an output signal as a function of the proportion of the total illumination of the scene by preexposure flash illumination;
   means for selectively bypassing said filtering circuit means; and
   transducer means for adjusting the exposure varying member selectively in response to said output signal, or in response to said intermediate signal when said filtering circuit means is bypassed.